United States Patent [19]

Pospischil

[11] B 4,011,406

[45] Mar. 8, 1977

[54] PCM REGENERATOR

[75] Inventor: Reginhard Pospischil, Lochham, Germany

[73] Assignee: Siemens Aktiengesellschaft, Berlin & Munich, Germany

[22] Filed: Mar. 19, 1975

[21] Appl. No.: 559,631

[44] Published under the second Trial Voluntary Protest Program on March 23, 1976 as document No. B 559,631.

[30] Foreign Application Priority Data

Apr. 10, 1974   Germany .......................... 2417644

[52] U.S. Cl. .............................. 178/70 R; 307/268
[51] Int. Cl.² .................... H03K 5/01; H04L 25/20
[58] Field of Search .......... 178/70 R, 70 TS, 71 R, 178/71 B, 73, 69 A, 69 B; 179/170 R, 170 E, 170 T; 325/42; 307/268, 260; 328/164

Primary Examiner—Thomas A. Robinson
Attorney, Agent, or Firm—Hill, Gross, Simpson, Van Santen, Steadman, Chiara & Simpson

[57] ABSTRACT

A PCM regenerator including an amplitude decision device, a time decision device which includes an input transformer with its secondary connected to a pair of transistors which form a push-pull circuit and wherein the output of directly consecutive pulses always have different polarities and accurately reconstructed pulses are produced.

4 Claims, 3 Drawing Figures

PCM REGENERATOR

BACKGROUND OF THE INVENTION

1. Field of the Invention:

This invention relates in general to PCM regenerators pseudoternary-coded signal pulses and in particular to a new and novel regenerator.

2. Description of the Prior Art:

As described in the "Bell System Technical Journal" of January 1962 at pages 25 through 97, and in particular with reference to FIG. 1 on page 29 and the associated description on page 28, PCM regenerators are known which contain two separate amplitude and time decision devices. In such systems the timing pulse required for the time regeneration is obtained from bipolar input pulses by means of double path rectification with an amplitude limitation stage following. In such known regenerators incorrect decisions can result in consecutive pulses of identical polarity being supplied at the output. In order to maintain cross-talk as small as possible the total attenuation of the line attenuation and the distortion correction is designed so that at the input of the decision device a single pulse appears which has a generally $\cos^2$ shape and a base with a width equal to double the bit length. With such dimensioning directly consecutive transmitted pulses produce a pulse which is considerably greater in amplitude and has a substantially greater base width at the input of the following regenerator. This causes the next following bit to be disturbed and increases the probability that such bit will be incorrectly regenerated. Thus, errors can be introduced into the communication system in long transmission links containing regenerators of the prior art type and generally pulses of one polarity appear at the output of the transmission link.

SUMMARY OF THE INVENTION

It is an object of the present invention to develop a PCM regenerator which produces output pulses that have successively different polarities. This objective is obtained by utilizing an input transformer which has a secondary center tapped and has a primary winding connected to the input terminals of the regenerator and wherein the opposite ends of the secondary winding are connected to the base electrodes of two pnp transistors which form a push-pull circuit and wherein the center tapped secondary winding is connected to ground through a first resistor and is connected to serially connected diodes bridged by a capacitor which have their other sides connected to a voltage source. An additional pnp transistor has its base terminal connected to a voltage divider formed from two resistors and a capacitor connected in parallel with one of the resistors and with its emitter terminals connected to the emitter terminals of the push-pull transistors and through a resistor to the positive operating voltage. The collector terminal of the third pnp transistor is connected through a resistor to the base terminal of a first npn transistor. The emitter terminal of the first npn transistor is directly connected to ground and the base terminal of such transistor is connected to ground through a resistor. The collector of this transistor is connected through a resistor to the bias voltage. Second and third npn transistors have their bases respectively connected to the collectors of the two push-pull pnp transistors and the second and third npn transistor have their emitters connected to ground and their bases connected to ground through resistors. The collector of the second npn transistor is connected to a first input of a first NAND gate and the collector of the third npn transistor is connected to the first input of a second NAND gate. The output of the first NAND gate is connected to the resetting input of a first JK flip-flop and the output of the second NAND gate is connected to the resetting input of a second JK flip-flop. The inverting output of the first JK flip-flop is connected to the second input terminal of the first NAND gate and the inverting output of the second JK flip-flop is connected to the second input terminal of the second NAND gate. The K inputs of the two JK flip-flops are connected together and through a resistor to the operating voltage. The pulse train inputs of the two JK flip-flops are connected together and to the pulse train supply. The two J inputs of the two JK flip-flops are connected together and to the collector of the first npn transistor and to a terminal for the pulse train synchronization. The output of the first JK flip-flop is connected to the first output terminal and the output of the second JK flip-flop is connected to the second output terminal of the regenerator.

The main advantage of the PCM regenerator of the invention lies in the fact that with the relatively simple construction for most disturbances a fault correction is accomplished because two directly consecutive input pulses having the same polarity only the first pulse will be regenerated. For many applications and in particular for the integration of the PCM regenerator circuit the input transformer can be replaced by an electronic push-pull circuit.

Another preferred embodiment of the PCM regenerator according to the invention, provides that from the unipolar pulses at the common emitter point there is obtained a control voltage which is proportional to the peak voltage of the input pulses and which serves to adjust an automatic line distortion correcting device or the threshold voltage of the amplitude decision device and wherein a base voltage divider is provided which is formed from three diodes which are connected in series and bridged by a capacitor and operated by the operating voltage in the forward direction and connected to ground through a resistor. A diode which is operated in the forward direction is inserted between the two parallel connected emitters of the push-pull transistors and the emitter of the third pnp transistor and a further diode and a further capacitor are provided which form a series circuit connected between the common emitter point and the operating voltage and wherein the connecting point between the further diode and the further capacitor is connected to a control voltage terminal.

Temperature stabilization of the push-pull stage in this modification is provided by a base voltage divider which is of special construction.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
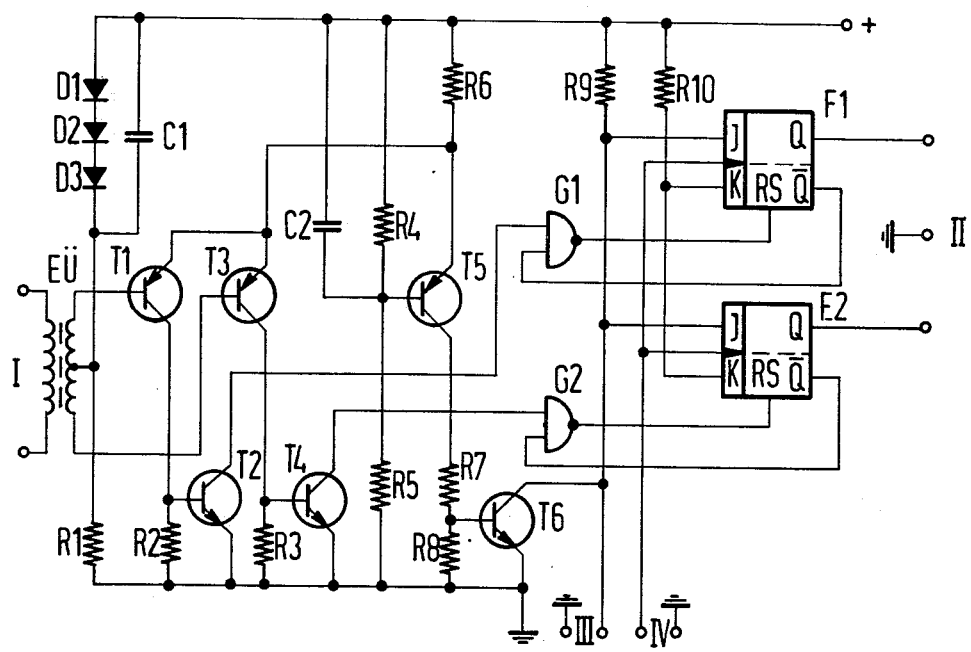
FIG. 1 is a schematic diagram of a PCM regenerator of the invention.

FIG. 1 illustrates the PCM regenerator of the invention and includes a pair of input terminals I which are connected to the primary of an input transformer EU. The secondary of the transformer EU has its midpoint connected to ground through a resistor R1 and connected to a positive voltage source through series connected diodes D1, D2 and D3 which are connected in parallel with a capacitor C1. The inputs supplied to the primary of the transformer EU are normally distorted in amplitude and time and normally the input signal will generally have been passed through a distortion correcting device which has a frequency response so as to compensate for the frequency response of the transmission cable.

The input transformer EU is designed as a push-pull transformer and opposite ends of the secondary are connected to the bases of pnp transistors T1 and T3. The emitters of transistors T1 and T3 are connected together and to a resistor R6 which has its other side connected to the positive bias voltage terminal. The common emitters of transistors T1 and T3 are connected to the emitter of a pnp transistor T5 which has its base connected to the junction point between resistors R4 and R5 connected between the positive bias voltage source and ground. A capacitor C2 is connected between the base of transistor T5 and the positive voltage bias terminal.

The transistors T1, T3 and T5 serve as amplitude decision devices with the input signal connected to the bases of transistors T1 and T3 and a comparison voltage is connected to the base terminal of transistor T5. The level of the comparison voltage is selected such that at amplitude levels below a specific value the transistor T5 will be conductive and transistors T1 and T3 will remain cut-off. If the amplitude of an input signal pulse exceeds such given value, then depending upon the polarity of the pulse, one of the two transistors T1 or T3 will become conductive while the transistor T5 will be cut-off.

An npn transistor T2 has its base connected to the collector of transistor T1 and its base connected to a resistor R2 which has its other side connected to ground. A transistor T4 has its base connected to the collector of transistor T3 and also to a resistor R3 which has its other side connected to ground. The emitters of transistors T2 and T4 are connected to ground. The transistors T2 and T4 are npn types. The collector of transistor T5 is connected to ground through resistors R7 and R8 and the junction point of the resistors R7 and R8 is connected to the base of an npn transistor T6 which has its emitter connected to ground. A first NAND gate G1 receives a first input from the collector of transistor T2 and a second NAND gate G2 receives a first input from the collector of transistor T4. A pair of JK flip-flops F1 and F2 are provided and the output of NAND gate G1 is connected to the reset terminal RS of flip-flop circuit F1. The output of NAND gate G2 is connected to the reset terminal RS of flip-flop circuit F2. The J inputs of the JK flip-flops F1 and F2 are connected to the positive voltage through resistor R9 and to a terminal for pulse train synchronization labeled III. The K inputs of the JK flip-flop circuits F1 and F2 are connected to the positive voltage source through resistor R10. The second of the two inputs of the first NAND gate G1 is supplied the inverse output Q of flip-flop circuit F1. The second input to the NAND gate G2 is the inverse output Q from flip-flop F2. The triggerring inputs to the JK flip-flops F1 and F2 are connected together and to a regenerator input for the timing pulse designated IV. The Q output of the flip-flop circuit F1 forms one of the output terminals and the Q output of flip-flop circuit F2 forms the other output terminal. The output terminals are designated by II and a grounded center terminal is illustrated.

The collector of transistor T6 is connected to the output terminal III for the pulse train synchronization and to the J inputs of the two JK flip-flops F1 and F2 and supplies amplitude regenerated unipolar pulse train for purposes of time decision. The timing pulse occurring approximately in the center of the input pulse at the pulse train input of the two JK flip-flops sets the one JK flip-flop while the other previously set JK flip-flop is reset by this timing pulse. Thus, rectangular pulses of full bit width will appear at the Q outputs of the two JK flip-flops. Since a directly following input pulse of identical polarity, cannot reset the already set JK flip-flop such pulse will be suppressed and in the case of two directly following input pulses of identical polarity only the first pulse will be regenerated. Thus, a correction of faults will occur for most cases.

In the circuit of FIG. 1 when input pulses are supplied to the bases of transistors T1 and T3 which have an amplitude which is lower than the comparison voltage a logic 1 will appear at the collectors of the transistors T2 and T4 and at the same time a logic 0 will simultaneously appear across the collector of the transistor T6. If the amplitude of an input pulse exceeds the value of the comparison voltage, then independently of the polarity of this input pulse, a logic 1 appears across the collector of the transistor T6 and logic 0 signals will appear across the collector of one of the two transistors T2 and T4 depending upon the polarity of the input pulse. Thus, a unipolar pulse train will be regenerated in terms of amplitude and will appear across the collector of transistor T6 and an amplitude regenerated pulse in each case of a specific polarity may be simultaneously obtained from the collectors of the transistors T2 and T4.

The PCM regenerator described with reference to FIG. 1 contains only resistors and semiconductor elements except for the two capacitors C1 and C2 and the input transformer EU and can thus be easily constructed in integrated circuit form. It is also possible if the circuit is to be made in integrated circuit form to utilize known electronic push-pull circuits instead of the input transformer EU.

Figure 2:
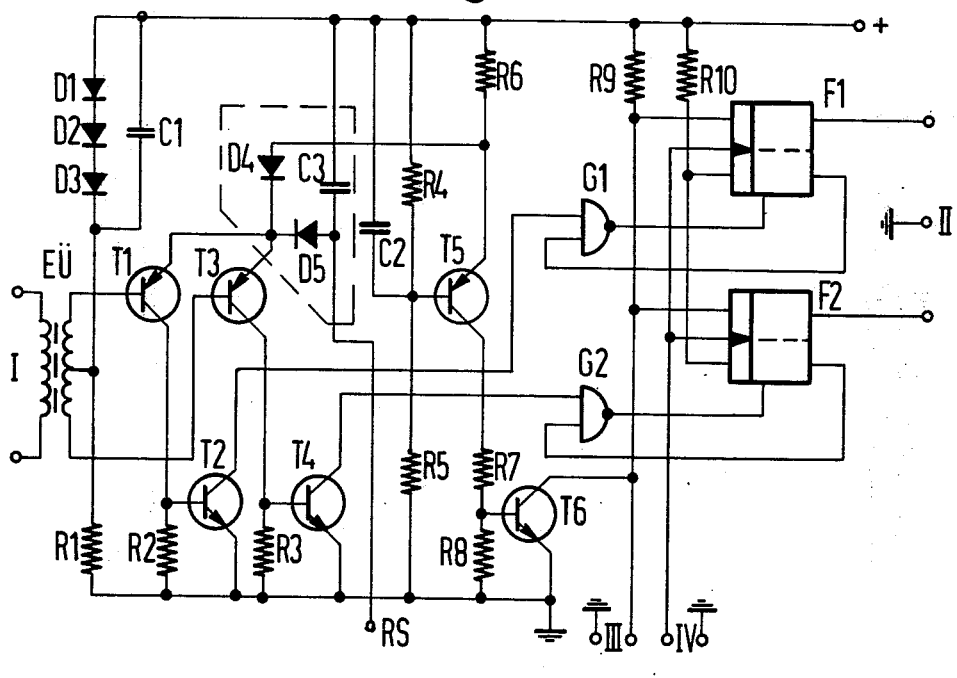
FIG. 2 illustrated the PCM regenerator of FIG. 1 with a circuit for producing a control voltage which can be removed and FIG. 3 illustrates the PCM regenerator of FIG. 1 with an additional control voltage generation arrangement for the adjustment of the threshold voltage of the amplitude decision device.

FIG. 2 illustrates a modification of the invention which utilizes an additional network outlined in broken lines and comprising the two diodes D4 and D5 and capacitor C3. The remaining portions of circuit FIG. 2 except for the diodes D4 and D5 and capacitor C3 are identical to those in FIG. 1 and will not be described in detail. The diode D4 is operated in the forward direction and connected from the emitter of transistor T5 to the emitters of transistors T1 and T3. The capacitor C3 is connected between the positive voltage source and an output terminal RS. The diode D5 is connected between terminal RS and the emitter of transistor T3. A control voltage will exist at the junction point between the capacitor C3 and D5 and is supplied to terminal RS. This control voltage will be proportional to the peak voltage of the input pulses and can be used for example, to control an automatic line distortion correcting device.

Figure 3:
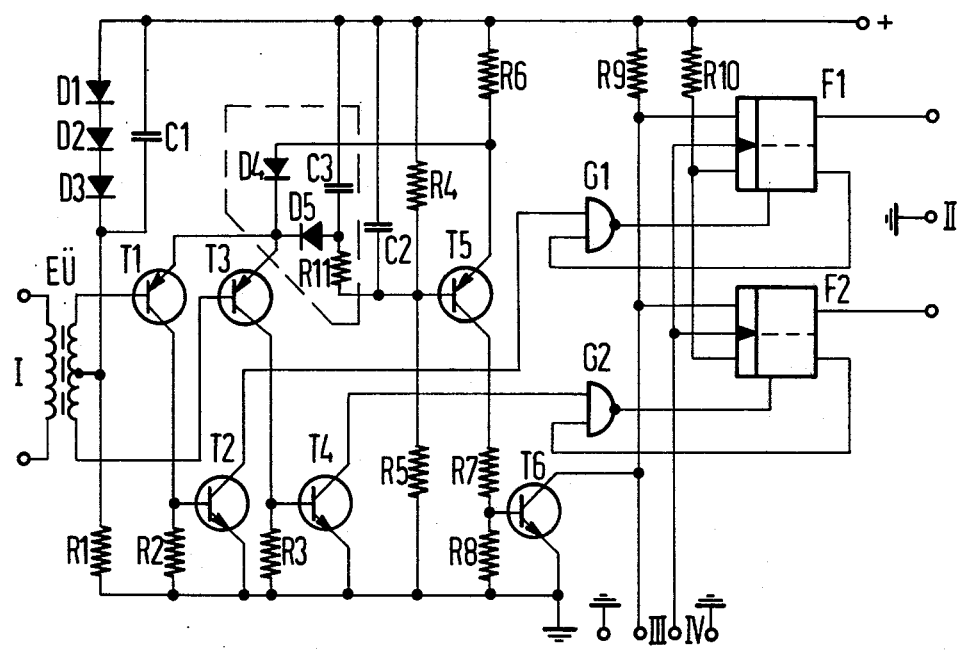

FIG. 3 is a modification of the regenerator illustrated in FIG. 1 utilizing an additional components comprising diodes D4 and D5, a capacitor C3 and a resistor R11. All of the remaining components are identical to those illustrated in FIG. 1 and will not be again described in detail. Diode D4 is connected from resistor R6 to the emitter of transistor T3. Capacitor C3 has one side connected to the positive voltage supply and the other side is connected to Diode D5 which has its cathode connected to the emitter of transistor T3. Resistor R11 is connected from the junction point of capacitor C3 and diode D5 to the base of transistor T5. The additional circuit illustrated in dash line in FIG. 3 produces a control voltage from the input pulses occurring in unipolar form at the common emitter point of the transistors T1 and T3 which control voltage is conducted to the base of the third pnp transistor T5 where it alters the level of the comparison voltage.

The additional components illustrated in FIGS. 2 and 3 which are utilized to produce control voltages can due to their relatively simple construction produce a considerably improved results in the function of the overall arrangement of the circuit of FIG. 1 and can also be suitably combined with one another.

Although the invention has been described with respect to preferred embodiments it is not to be so limited as changes and modifications can be made which are within the full intended scope of the invention as defined by the appended claims.

I claim as my invention:

1. A PCM regenerator for pseudoternary-coded signal pulses having an amplitude decision device,
    a time decision device,
    a pair of input terminals receiving the input pulses which have been corrected for cable attenuation and output terminals where the regenerated pulses which have been regenerated in amplitude and time may be obtained, comprising an input transformer which has a center tapped secondary winding and a primary winding which is connected to said input terminals of the regenerator,
    a first pair of pnp transistors which form a push-pull circuit and with their bases, respectively, connected to opposite ends of said secondary winding,
    a base voltage divider for the push-pull circuit connected to the center tap of said secondary winding,
    a first capacitor connected in parallel with said voltage divider,
    a second voltage divider formed of two resistors,
    a third pnp-transistor with its base connected to said second voltage divider,
    a second capacitor connected in parallel with one of said resistors, the emitter of said third transistor connected to the emitters of said first pair of transistors,
    a third resistor connecting said emitters to a positive operating voltage,
    a first npn transistor,
    the collector of said third transistor connected to the base terminal of said first npn transistor through a fourth resistor,
    the emitter of said first npn transistor connected to ground,
    the base of said first npn transistor connected to ground through a fifth resistor,
    the collector of said first npn transistor connected through a sixth resistor to said operating voltage,
    second and third npn transistors with the base of each, respectively, connected to the collectors of said pair of pnp transistors,
    the emitters of said second and third npn transistors connected to ground, and their bases connected through seventh and eighth resistors to ground,
    first and second NAND gates,
    the collector of said second npn transistor connected to the first input terminal of said first NAND gate,
    the collector of said third npn transistor connected to the first input terminal of said second NAND gate,
    first and second JK flip-flops,
    the output of the first NAND gate connected to the resetting input of said first JK flip-flop,
    the output of the second NAND gate connected to the resetting input of said second JK flip-flop,
    the inverting output of said first JK flip-flop connected to a second input of said first NAND gate,
    the inverting output of said second JK flip-flop connected to the second input of said second NAND gate,
    the K inputs of the first and second JK flip-flops connected together and through a ninth resistor to the operating voltage,
    the pulse train inputs of the first and second JK flip-flops connected together and to the pulse train supply,
    the J inputs of said first and second JK flip-flops connected together and to the collector of said first npn transistor and to a pulse train synchronization terminal, and
    the Q output of the first JK flip-flop connected to an output terminal, the Q output of the second flip-flop connected to the second output terminal of the regenerator.

2. A PCM regenerator according to claim 1 wherein an electronic push-pull circuit replaces said input transformer.

3. A PCM regenerator according to claim 1 wherein said base voltage divider comprises three diodes connected in series and in parallel with said first capacitor, said diodes connected to the operating voltage in the forward direction, and a tenth resistor connected from said diodes to ground,
    a fourth diode operated in the forward direction connected between the emitters of said first pair of pnp transistors and the emitter of said third pnp transistor,
    a fifth diode and a third capacitor connected in series and connected between the operating voltage, and the emitters of said first pair of pnp transistors, and the connection point between said fifth diode and said third capacitor providing a control voltage source point.

4. A PCM regenerator according to claim 3, containing an eleventh resistor, connected from the junction point between said third capacitor and said fifth diode to the base of said third pnp transistor.

* * * * *